J. C. SCHMIDT.
Whip-Handle.
No. 227,392. Patented May 11, 1880.
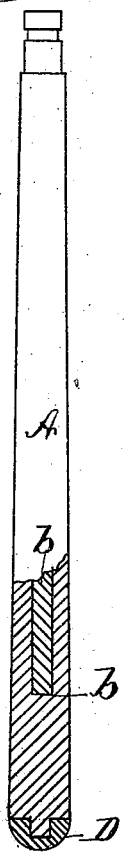
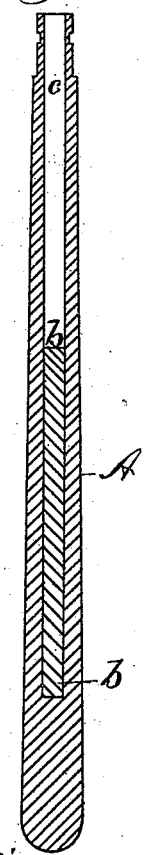
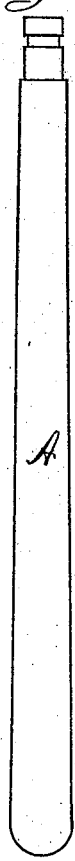
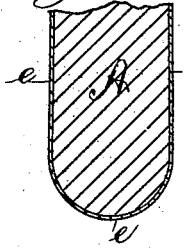
Witnesses
Wm H Chapin
H. A. Chapin
Inventor
John C Schmidt
By Chapin & Co
Atty's

UNITED STATES PATENT OFFICE.

JOHN C. SCHMIDT, OF WESTFIELD, MASSACHUSETTS.

WHIP-HANDLE.

SPECIFICATION forming part of Letters Patent No. 227,392, dated May 11, 1880.

Application filed April 28, 1879.

*To all whom it may concern:*

Be it known that I, JOHN C. SCHMIDT, of Westfield, county of Hampden, and State of Massachusetts, have invented new and useful Improvements in the Construction and Finish of Whip-Handles, which improvements are fully set forth in the annexed specification, and in the accompanying drawings.

The object of my invention is the production of loaded wooden whip-handles which present a solid unbroken exterior surface to adapt them for the application of a surface enamel in imitation of ivory and other fancy-colored materials, so that no joints in the handle may interfere to destroy the continuity of said enamel surface; and it consists in constructing a loaded wooden whip-handle by piercing the handle from the upper end downward to form a load-piece chamber, and causing said chamber to terminate above the butt, so as to leave that portion of the handle solid, and in providing for the application to the solid-ended butt of said handle of a button-tip without cutting into the load-piece chamber.

Referring to the drawings, which consist of four figures, Figure 1 is an elevation, partly in section, showing a tip attached to a solid butt. Fig. 2 is a sectional elevation. Fig. 3 is a plain elevation. Fig. 4 is an enlarged view of a section of the butt of a finished handle.

In the drawings, A is the whip-handle. *e* is an enamel coating on the surface of handle A. *b* is the load-piece. D, Fig. 1, is a butt-tip. *c* is a load-piece chamber bored in handle A.

Turned whip-handles such as are herein shown have heretofore been loaded by boring into the butt upwardly, inserting the load-piece therein, and afterward plugging up the hole to keep the load-piece in place. Handles so loaded have been found to be objectionable, inasmuch as it has been found difficult to give the butt the requisite convex form, and to cover it with any but a metal finish without having the plugged portion show. Therefore I make my improved handles A with a solid butt, and insert my load-piece *b* therein in a hole, *c*, bored from the top end of the handle nearly down to the butt, so that the load-piece may be allowed to drop down sufficiently low to serve its purpose in the handle.

Whip-handles made as above described can be finished with an unbroken coat of enamel over the end of the butt and above it, as shown in Fig. 4, in which the outer sectional lined portion, *e*, represents the enamel coating.

Another advantage which is gained by constructing the butt of the handle solid, as shown, is that it affords an opportunity for attaching more solidly thereto a fancy tip of ivory, bone, or metal, which, when the handle is enameled black or some other suitable color, supplies a beautiful contrast between the trimmings and the color of the handle.

The enamel herein referred to is a composition which may be made of any desired color, and of which I apply to the whip-handle with a brush such a thickness as may be required, allow it to harden, and then polish it smoothly in a lathe or otherwise.

What I claim as my invention is—

1. A wooden whip-handle provided with the load-piece chamber *c*, extending from its upper end downward, and terminating above its butt, and adapted to receive therein the metallic load-piece *b*, substantially as and for the purpose described.

2. A wooden whip-handle provided with the load-piece chamber *c*, extending from its upper end downward, and terminating above its butt, and having the butt-tip D attached against its solid lower end, substantially as set forth.

JOHN C. SCHMIDT.

In presence of—
  H. A. CHAPIN,
  WM. H. CHAPIN.